United States Patent

[11] 3,601,629

[72] Inventor James R. Cricchi
Baltimore, Md.

[21] Appl. No. 9,380
[22] Filed Feb. 6, 1970
[45] Patented Aug. 24, 1971
[73] Assignee Westinghouse Electric Corporation
Pittsburgh, Pa.

[54] BIDIRECTIONAL DATA LINE DRIVER CIRCUIT FOR A MOSFET MEMORY
11 Claims, 3 Drawing Figs.

[52] U.S. Cl. .......... 307/205, 307/238, 307/279
[51] Int. Cl. .......... H03k 19/08
[50] Field of Search .......... 307/205, 254, 251, 304, 238, 279

[56] References Cited
UNITED STATES PATENTS

| | | | |
|---|---|---|---|
| 3,422,283 | 1/1969 | Murray et al. | 307/254 X |
| 3,483,400 | 12/1969 | Washizuka et al. | 307/251 X |
| 3,506,851 | 4/1970 | Polkinghorn et al. | 307/251 |

*Primary Examiner*—John S. Heyman
*Attorneys*—F. H. Henson and E. P. Klipfel

ABSTRACT: A noninverting buffer circuit of an integrated circuit memory coupled between an external data line having relatively large capacitance and an internal data line commonly coupled to one or more complementary, MOSFET memory cells which provides increased noise immunity and lower input capacitance for the memory cells so that nondestructive readout is achieved with improved access times. The data line driver circuit is comprised of two identical circuit portions connected between the external and internal data lines in mutually opposite directions and operate so as to be mutually operative and inoperative or both simultaneously inoperative to translate binary logic signals to and from the memory cells from an external source. When either of the two circuit sections are operable the operative section effectively acts as two logic inverters connected in series between the respective external and the internal digit data line.

BIDIRECTIONAL DATA LINE DRIVER CIRCUIT FOR A MOSFET MEMORY

The invention described herein was made in the performance of work under a NASA contract and is subject to the provisions of Section 305 of the National Aeronautics and Space Act of 1958, Public Law 85–568 (72 Stat. 435; 42 U.S.C. 2457).

CROSS REFERENCE TO RELATED APPLICATION

This invention is related to a copending application Ser. No. 9,381, entitled "Complementary MOSFET Integrated Circuit Memory," filed in the names of James R. Cricchi, et al., filed on Feb. 6, 1970. This invention is also assigned to the assignee of the present invention.

BACKGROUND OF THE INVENTION

1. Field of the Invention

This invention relates to an integrated circuit utilized in a high speed memory for a data processing system in which all of the active elements are comprised of metal oxide semiconductor field effect transistors hereinafter referred to as MOSFETs fabricated on a substrate of semiconductor material which may be for example silicon. More particularly, the present invention is comprised of a complementary MOSFET integrated circuit coupling an external data source to one or more memory cells of an array including a plurality of memory cells comprised of interconnected complementary MOSFETs.

2. Description of the Prior Art

Memories utilizing field effect transistors and driver circuits for the storage cells included therein have been disclosed in U.S. Pat. No. 3,275,996 issued to J. R. Burns and U.S. Pat. No. 3,440,444 issued to A. K. Rapp. In both of these teachings the common input/sense line is coupled to the input point of a storage cell and is also coupled to the conduction path of a coincidence gate, the impedance of which is controlled jointly by the output of the cell and by a control signal.

SUMMARY

Briefly, the subject invention comprises a read and write driver circuit section, each having an input terminal and an output terminal and wherein the input terminal of the write driver and the output terminal of the read driver are commonly connected to an external input/output data line and wherein the output terminal of the write driver and the input terminal of the read driver are commonly connected to an internal input/output data line. The read driver and the write driver are identical circuits including interconnected complementary MOSFETs having gate, source and drain terminals and comprise: a first and a second P-channel MOSFET connected in parallel by means of their respective source and drain terminals with the gate terminal of the first P-channel MOSFET being connected to the input terminal; a first and a second N-channel MOSFET connected in series by means of respective source and drain terminals between the common drain connection of said first and second P-channel MOSFET and a point of reference potential and wherein the respective gate terminals of the second P-channel MOSFET and the first N-channel MOSFET are commonly connected to a control signal terminal and the gate terminal of the second N-channel MOSFET is also connected to the input terminal; a third P-channel MOSFET connected by means of its source terminal to the common source connection of the first and second P-channel MOSFET to which is applied a positive supply potential; a third and fourth N-channel MOSFET connected in series by means of their respective source and drain terminals between said point of reference potential and the drain terminal of the third P-channel MOSFET and wherein the drain terminal of the third P-channel MOSFET and the drain terminal of the fourth N-channel MOSFET are also commonly connected to the output terminal, the gate terminal of the third N-channel MOSFET is connected to the control signal terminal which is common to the gate terminals of the second P-channel and the first N-channel MOSFET and finally the gate terminal of the fourth N-channel MOSFET is connected to the gate of the third P-channel MOSFET which is also connected to the common connection between the drain terminals of the first and second P-channel MOSFET. When a positive potential (B+) indicative of a logic "1" level is applied to the control signal terminal, the circuit effectively acts like a pair of logic inverters in series between the external digit data line and the internal digit data line; however, when zero or ground potential indicative of a logic "0" level is applied to the control signal terminal, the third P-channel MOSFET and the third N-channel MOSFET simultaneously become nonconductive and completely isolate the circuit from the internal data line.

DESCRIPTION OF THE PREFERRED EMBODIMENT

Figures 1, 2, 3:
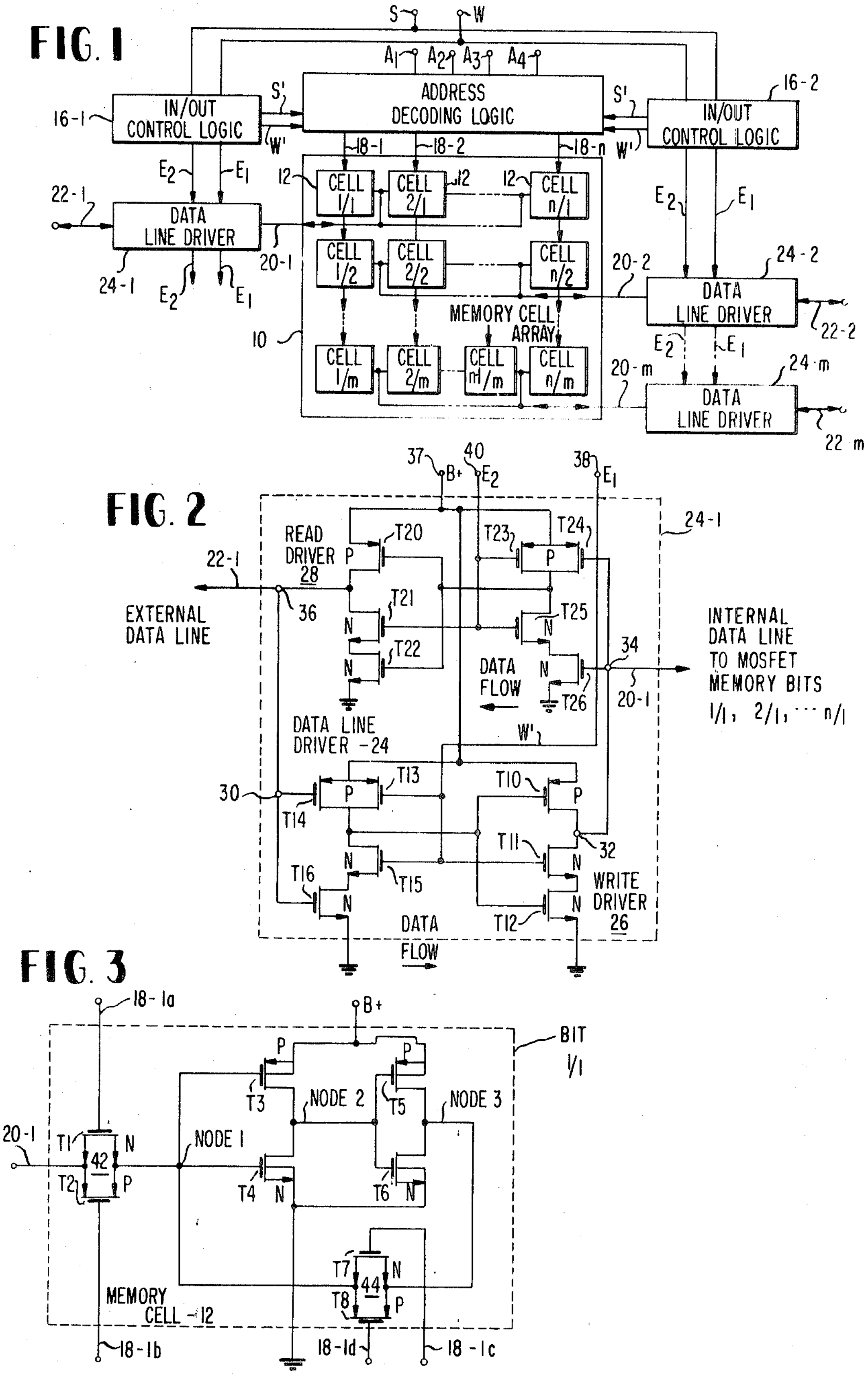
FIG. 1 is a block diagram of an integrated circuit memory system utilizing the subject invention.
FIG. 2 is an electrical schematic diagram of the preferred embodiment of the subject invention.
FIG. 3 is an electrical schematic diagram of a typical memory cell driven by the embodiment of the subject invention shown in FIG. 2.

Insulated gate field effect transistors of the type identified as metal oxide semiconductive field effect transistors (MOSFETs) are devices having first and second output terminals defining the ends of a current carrying or conduction path and a single control terminal that conducts substantially no current under steady state input conditions. These terminals are referred to as the source, drain and gate, respectively. Signals or voltages applied to the gate terminal control the impedance of the current conducting path between the source and drain. The device is biased or turned "on" when the gate voltage differs from the source voltage by a predetermined threshold level in a specified polarity direction. The MOSFET may be either a P-channel device or an N-channel device depending upon the conductivity type of material of the semiconductor. A P-channel MOSFET is identified in the drawings by an arrowhead pointing toward the unit and located on the terminal that usually functions as the source. Additionally, the device is bidirectional and a terminal may function as the source under one set of operating conditions and as a drain under another set of operating conditions in the same circuit. An N-channel MOSFET is identified in the drawings by an arrowhead pointing away from the unit. For a detailed discussion of this type of semiconductive device, reference is made to the publication "IEEE Transactions on Electronic Devices," July 1964, pages 324–345, inclusive.

Considering now the drawings, FIG. 1 discloses a block diagram of an integrated circuit memory such as disclosed in greater detail in the aforementioned related application Ser. No. 9,381 entitled "Complementary MOSFET Integrated Circuit Memory." Reference numeral 10 designates a memory cell array comprised of a plurality of memory cells 12 arranged in a matrix of *n* words having *m* bits per word. An address decoding logic circuit 14 receives four address inputs $A_1$, $A_2$, $A_3$ and $A_4$ from an external address source, not shown, as well as a read/write control signal W′ and a strobe control signal S′ from a pair of identical input/output control logic circuits 16–1 and 16–2 having respective inputs of a read/write signal W and a strobe signal S applied thereto from sources, not shown. The address decoding logic circuit 14 is coupled to each of the *n* words of the memory cell array 10 by means of respective circuit means 18–1, 18–2,...**18–*n*. Each of the circuit means 18–1...18–*n*** couples one or more address input control signals simultaneously to all of the *m* bits of the respective word of the array. The *m* bits of the *n* words are each coupled to a respective internal input/output data line 20–1, 20–2,...**20–*m*. Each of the internal data lines 20–1...20–**

*m* is coupled to a corresponding external input/output data line 22–1 ... 22–*m* by means of a data line driver 24–1...24–*m* which comprises the subject invention. The data line driver circuits for example circuit 24–1 acts as a buffer circuit between the external data line 22–1 and the internal data line 20–1 isolating the memory cells 12 of bits 1/1...*n*/1 from the relatively large capacitance appearing on the external data line 22–1 in order to achieve nondestructive readout as will be explained in greater detail as the description and operation of the subject invention continues.

Each of the data line drivers 24–1...24–*m* comprise identical circuits and receive two enabling or inhibit signals $E_1$ and $E_2$ from the input/output control logic circuits 16–1 and 16–2 which operate the data line driver circuits to translate binary logic signals to and from the memory cells 12 and a binary source not shown coupled to the external digit data lines 22–1...22–*m*.

Directing attention now to FIG. 2, there is disclosed a schematic diagram of the preferred embodiment of the subject invention which is identified for purposes of explanation as the data line driver circuit 24–1 shown in block form in FIG. 1. The data line driver circuit 24–1 is selected for illustration inasmuch as all of the data line driver circuits 24–2...24–*m* are identical and the operation and description of operation of one will suffice. The data line driver circuit 24–1 is comprised of a write driver section 26 and a read driver section 28. The write driver section includes an input and an output terminal 30 and 32 while the read driver section 28 includes an input terminal 34 and an output terminal 36. The write driver section 26, moreover, is comprised of MOSFETs T10 through T16, whereas the read section 28 is comprised of MOSFETs T20 through T26. The interconnection of the MOSFETs T10 through T16 and T20 through T26 however is identical but coupled to the external data line 22–1 and the internal data line 20–1 in opposite directions. In other words, the input terminal 30 and the output terminal 36 are commonly connected to the external digit data line 22–1. In a like manner, the output terminal 32 and the input terminal 34 are commonly connected to the internal data line 20–1.

Considering the write driver section 26, a first and second P-channel MOSFET T14 and T13 are parallely connected by means of their source and drain terminals with the common source terminal connected to a positive supply potential B+ applied to terminal 37. The common drain terminal of MOSFETs T14 and T13 are directly connected to the gate of a third P-channel MOSFET T10 whose source terminal is also connected to B+ potential. A first and second N-channel MOSFET T15 and T16 are connected in series by means of their respective drain and source terminals between the common connection of the drain terminals of MOSFETs T14 and T13 and a point of reference potential illustrated as ground. The gate terminal of the first P-channel MOSFET T14 and the second N-channel MOSFET T16 are commonly connected to the input terminal 30. The gate terminals of the second P-channel MOSFET T13 and the first N-channel MOSFET T15 are commonly connected to the control signal $E_1$applied to the control signal terminal 38. A third and fourth N-channel MOSFET T11 and T12 are connected in series by means of their drain and source electrodes between the drain of the P-channel MOSFET T10 and ground. The common connection between the drain terminals of the P-channel MOSFET T10 and the N-channel MOSFET T11 are connected to the output terminal 32. The gate terminals of the P-channel MOSFET T10 and the N-channel MOSFET T12 are directly connected to the common drain terminals of MOSFETs T13 and T14 while the gate terminal of the N-channel MOSFET T11 is connected to the gates of MOSFETs T13 and T15 which are connected to terminal 38.

The read driver section 28 is identical to the write driver section 26 with the P-channel MOSFET T20 corresponding to MOSFET T10. The N-channel MOSFET 21 corresponding to the N-channel MOSFET T11, etc. A second control signal $E_2$however is applied to the control signal terminal 40 which is directly connected to the gates of the P-channel MOSFET T23 and the N-channel MOSFETs T21 and T25.

Before describing the operation of the data line driver circuit 24–1 shown in FIG. 2, attention is directed first briefly to the electrical schematic diagram of a typical MOSFET memory cell 12 utilized in combination with the subject invention and which is disclosed in detail in FIG. 3. The memory cell 12 which may be for example the cell or bit 1/1 signifying the first bit of the first word is comprised of complementary MOSFETs T1 through T8. The parallely connected MOSFETs T1 and T2 comprise an input/output transmission switch 42 coupled between the internal data line 20–1 and circuit node 1. This connection is by means of the drain and source terminals of MOSFETs T1 and T2. The gate terminals of MOSFETs T1 and T2 are connected to the address decoding logic circuit 14 by circuit means 18–1 which comprises a first and second circuit lead 18–1*a* and 18–1*b*. The MOSFETs T3, T4, T5 and T6 comprise a flip-flop circuit and are coupled together as complementary pairs of inverter circuits by means of the circuit node 2. A feedback transmission switch 44 comprising the complementary pair of MOSFETs T7 and T8 are parallely connected by means of their source and drain terminals between the circuit node 1 and circuit node 3. The gate terminals of MOSFETs T7 and T8 are connected to circuit leads 18–1*c* and 18–1*d* respectively, which is also included in the circuit means 18–1 from the address decoding logic circuit 14. The operation of the memory cell 12 is explained in detail in the copending related application Ser. No. 9,381 referenced above. Briefly, the complementary MOSFETs T3 through T6 operate as a flip-flop circuit coupled between circuit nodes 1 and 3 and is adapted to store a voltage indicative of a binary logic state appearing on the internal data line 20–1 when the input/output transmission switch 42 is energized during the "write" mode of operation by the application of suitable control signals on circuit leads 18–1*a* and 18–1*b*. After the information is fed into the logic cell, the feedback transmission switch 44 is closed by means of control signals applied to circuit leads 18–1*c* and 18–1*b* directly connecting circuit nodes 1 and 3 thereby latching the cell. The state of the memory cell 12 as designated by the logic signal level appearing at node 1 will remain in storage until the input/output transmission switch 42 is again energized in the "read" mode which directly connects the internal data line 20–1 to circuit node 1. It has been noted in the related copending application that should a relatively large load capacitance suddenly appear at circuit node 1 during the "read" mode of operation such as when an external data line 22–1 is directly connected to the input/output transmission switch 24, as is commonly done in prior art apparatus, it is possible to destroy the state of the memory cell on readout. In order to provide a nondestructive readout of the memory cell 12 such as shown in FIG. 3, the capacitance must be reduced significantly by the inclusion of a data line driver circuit such as shown in FIG. 2 and which is the subject of the present invention.

Considering now for example the operation of the data line driver circuit 24–1 shown in FIG. 2, there are four conditions of operation wherein the control signals $E_1$and $E_2$are either at the logic "1 " level (B+ ) constituting an enabling signal or a logic "0" level (O volts) constituting an inhibit signal. The first condition of operation defined as the "inactive" state of operation occurs when both the signal $E_1$applied to the write driver section 26 and the signal $E_2$applied to the read driver section 28 are both at a logic "0" level thereby disabling both sections 26 and 28. Any binary data appearing at the external data line 22–1 is said to be undefined due to the fact that there is a complete open circuit between the external digit data line 22–1 and the internal data line 20–1. This can be explained simply by the fact that no current flow occurs from the output terminal 32 of the write driver 26 to the input terminal 30 under any conditions because of the insulated gates of MOSFETs T14 and T16. This means that the read driver only may be considered. Since zero volts appears at the terminal 40, the P-channel MOSFET T23 turns "on" while the N-channel MOSFETs T21 and T25 turn "off." Since MOSFET T23 is conducting B+ appears simultaneously at the gates of MOSFETs T20 and T22. Because MOSFET T20 is a P-channel MOSFET, it turns "off." However, the N-channel MOSFET T22 is isolated due to the fact that MOSFET T21 has already turned "off." In this situation there is a complete open circuit between the drain terminals of MOSFETs T20 and T21 and the output terminal 36 connected to the external data line 22–1.

Next an "intermediate" state is defined wherein binary data established on the external data line 22–1 is available at the internal data line 20–1 by the enabling of the write driver section 26 by making the control signal $E_1$a logic "1" while disabling the read driver circuit 28 by applying a logic "0" signal at the control signal $E_1$but the memory cells are not addressed. If a logic "1" (B+ ) appears at the external data line 22–1, both P-channel MOSFETs T13 and T14 turn "off" while the N-channel MOSFETs T15 and T16 will turn "on" placing the gate of the P-channel MOSFET T10 at ground potential turning it "on," applying B+ potential to the internal data line 20–1. Meanwhile, however, the N-channel MOSFET T12 has turned "off" thereby isolating the N-channel MOSFET T11 from the internal data line 20–1. Although the write driver section 26 has been enabled, the intermediate state as stated above defines a situation where none of the memory cells 12 comprising the bits 1/1...*n*/1 are coupled to the internal data line 20–1 because of the inhibition of their respective input/output transmission switch 42 by the lack of suitable address signals appearing on the circuit leads 18–1*a* and 18–1*b*.

A "write" mode of operation is established wherein the binary data appearing on the external data line 22–1 is transferred into one or more memory bits 1/1...1/*n* for storage by the activation of a respective input/output transmission switch 42. In the write mode, the control signal $E_1$is a logic "1" while the signal $E_2$is a logic "0" as in the intermediate state. If for example a logic "0" signal appears at the external data line 22–1, the P-channel MOSFET T13 turns "off" while T14 turns "on." B+ then appears at the drain of T15 and turns "on" sufficiently long to turn "off" the N-channel MOSFET T16. The B+ appearing at the gate of the P-channel MOSFET T10 turns it "off" while the N-channel MOSFETs T11 and T12 turn "on" putting the internal data line 20–1 at ground potential due to the simultaneous conduction of MOSFETs T11 and T12.

In the "read" mode, the control signal $E_2$is a logic "1" while the control signal $E_1$is a logic "0." The write driver section 26 is disabled or inhibited thereby while the read section 28 is enabled. Considering now where it is desirable to read a logic "1" from an addressed memory cell 12 of the bits 1/1...1/*n*, the internal data line 20–1 has B+ potential applied thereto. In this situation, the P-channel MOSFETs T23 and T24 turn "off" while the N-channel MOSFETs T25 and T26 having B+ applied to their gate terminals turn "on" putting the gate terminals of the P-channel MOSFET T20 and the N-channel MOSFET T22 at ground. They respectively turn "on" and "off" coupling the B+ appearing at the source of the P-channel MOSFET T20 to the external data line 22–1 as required.

It should be observed that current flow to the external data line 22–1 is accomplished only from B+ through the action of the MOSFETs T20, T21 and T22. As noted infra, current flow does not occur from the external data line to the write driver section 26 because of the connection of the gate terminals of the MOSFETs T14 and T16 to the input terminal 30. Accordingly, all of the MOSFETs except T20, T21, and T22 in the data line driver circuit 24–1 can be minimum size devices, that is, having a channel width-to-length ratio which is in the order of 1 whereas the MOSFETs T20, T21 and T22 must necessarily be of a comparatively larger size in order to drive the relatively large external capacitance associated with the external data line 22–1. This means that the width-to-length ratio of the MOSFETs T20, T21 and T22 must be in the order of, for example, 20. It also can be seen that all of the MOSFETs coupled to the internal data line 20–1 are relatively small, thereby reducing the capacitance appearing on the internal data line. This reduction of the capacitance on the internal data line 20–1 provides a nondestructive readout of the memory cells when operated in accordance with the teachings of the copending related application Ser. No. 9,381, that is when the transmission switch 42 of a cell 12 is operated such that the P-channel MOSFET T2 is turned "on" prior to the N-channel device T1 in the read mode.

What is significant about the write driver section 26 and the read driver section 28 is that when they are respectively enabled they effectively act as a pair of logic inverter circuits in series. Considering the write driver section 26, for example, the P-channel MOSFET T14 always has an opposite conductive state with respect to the N-channel MOSFET T16 and the P-channel MOSFET T10 has an opposite conductive state to the N-channel MOSFET T12. Also, the P-channel MOSFETs T14 and T10 have mutually opposite conductive states as does the two end channel MOSFETs T16 and T12. The translation of the logic states between the external data line 22–1 and the internal data line 20–1 occurs without a direct connection at any time therebetween, thereby providing a buffering or an isolation of the internal data line 20–1 from the relatively large capacitance of the external data line 22–1.

What has been shown and described, therefore, is an integrated circuit bidirectional memory data line driver comprised of complementary MOSFETs and which is adapted to provide high output conductance for fast switching, isolation between the internal devices and large external line capacitance, increased noise immunity and lower input capacitance.

I claim as my invention:

1. An electrical signal translation circuit utilizing electronic switch means having a current control terminal and a first and a second current conducting terminal and powered by at least one supply potential, comprising in combination:

an input and an output terminal;

first and second electronic switch means having respective first and second current conducting terminals connected in parallel and additionally including circuit means coupling said first current conducting terminals to said supply potential, and circuit means coupling the current control terminal of said first electronic switch means to said input terminal;

third and fourth electronic switch means having respective first and second current conducting terminals connected in series between a point of reference potential and said second current conducting terminals of said first and second electronic switch means, and additionally including circuit means coupling the current control terminal of said third semiconductor switch means to the current control terminal of said second electronic switch means and circuit means coupling the current control terminal of said fourth electronic switch means to said input terminal;

fifth, sixth and seventh electronic switch means coupled together in series by their respective first and second current conducting terminals between said point of reference potential and said supply potential, said fifth and sixth electronic switch means having a common connection between respective second and first current conducting terminals and additionally including circuit means coupling said common connection to said output terminal, circuit means coupling the current control terminal of said fifth electronic switch means and the control terminal of said seventh electronic switch means commonly connected to said common connection of the second current conducting terminals of said first and second electronic switch means;

and a control input terminal commonly connected to the current control terminals of said second, third and sixth electronic switch means being adapted to provide a control signal for enabling an inhibiting signal flow from said input terminal to said output terminal.

2. The invention as defined by claim 1 wherein all said electronic switch means comprise semiconductor switch means.

3. The invention as defined by claim 2 wherein said semiconductor switch means comprise transistors.

4. The invention as defined by claim 3 wherein said transistors comprise insulated gate field effect transistors.

5. The invention as defined by claim 1 wherein said first, second and fifth electronic switch means comprise P-channel metal oxide semiconductor field effect transistors and said third, fourth, sixth and seventh electronic switch means comprise N-channel metal oxide semiconductor field effect transistors.

6. A data line driver circuit for an integrated circuit memory coupled between an external input/output data line and an internal input/output data line connected to at least one memory cell and powered by at least one supply potential, comprising in combination:

a first and a second circuit section, each said section having an input terminal and an output terminal and including circuit means commonly connecting the input terminal of said first circuit section and the output terminal of said second circuit section to said external input/output data line and the output terminal of said first circuit section and the input terminal of said second circuit section to said internal input/output data lines, each said section utilizing semiconductor switches having a control terminal and a first and a second current conducting terminal and comprising;

first and second parallely connected semiconductor switches including circuit means commonly connecting the respective first current conducting terminals to said supply potential and the respective second current conducting terminals at a common junction and circuit means coupling the control terminal of said first semiconductor switch to said input terminal;

a third and fourth semiconductor switch including circuit means connecting said first current conducting terminal of said third semiconductor switch to the second current conducting terminal of said fourth semiconductor switch, circuit means connecting the second current conducting terminal of said third semiconductor switch to said common junction, circuit means connecting the first current conducting terminal of said fourth semiconductor switch to a point of reference potential, and circuit means connecting the control terminal of said fourth semiconductor switch to said input terminal;

a fifth semiconductor switch including circuit means connecting said first current conducting terminal to said supply potential, circuit means connecting said control terminal to said common junction and circuit means connecting said second current conducting terminal to said output terminal;

a sixth semiconductor switch including circuit means coupling said second current conducting terminal to said second current conducting terminal of said fifth semiconductor switch and circuit means connecting said control terminal commonly to the control terminals of said second and third semiconductor switches;

a seventh semiconductor switch including circuit means coupling said second current conducting terminal to the first current conducting terminal of said sixth semiconductor switch, circuit means connecting the first current conducting terminal to said point of reference potential and circuit means connecting said control terminal to said common junction of said first and second semiconductor switch; and a control input terminal including circuit means commonly connecting said control input terminal to the control terminals of said third, fourth and sixth semiconductor switches, said first and second circuit sections being adapted to be selectively enabled and inhibited by a binary signal applied thereto whereby binary data is translated from said external input/output data line to said internal input/output data line by means of said first circuit section and binary data is transferred from said internal input/output data line to said external input/output data line through said second circuit section.

7. The invention as defined by claim 6 wherein all said semiconductor switches are comprised of transistors.

8. The invention as defined by claim 6 wherein said first, second and fifth semiconductor switches are comprised of field effect transistors of a first semiconductivity type and said third, fourth, sixth and seventh semiconductor switches are comprised of field effect transistors of a second semiconductivity type 9. The invention as defined by claim 6 wherein all said semiconductor switches are comprised of field effect transistors.

10. The invention as defined by claim 6 wherein said first, second, and fifth semiconductor switches are comprised of insulated gate field effect transistors of a first conductivity type and said third, fourth, sixth and seventh semiconductor switches are comprised of insulated gate field effect transistors of a second conductivity type.

11. The invention as defined by claim 6 wherein said first, second and fourth semiconductor switches are comprised of P-channel metal oxide field effect transistors and said third fourth, sixth and seventh semiconductor switches are comprised of N-channel metal oxide field effect transistors.